US010812270B2

(12) United States Patent
Roberts et al.

(10) Patent No.: US 10,812,270 B2
(45) Date of Patent: Oct. 20, 2020

(54) TECHNIQUES FOR INCREASING THE PROBABILITY THAT A TRANSACTION WILL BE INCLUDED IN A TARGET BLOCK OF A BLOCKCHAIN

(71) Applicant: Citizen Hex Inc., Toronto (CA)

(72) Inventors: Benjamin Mark Roberts, Toronto (CA); Brett David Bergmann, Toronto (CA)

(73) Assignee: Citizen Hex Inc., Toronto (CA)

( * ) Notice: Subject to any disclaimer, the term of this patent is extended or adjusted under 35 U.S.C. 154(b) by 219 days.

(21) Appl. No.: 15/947,511

(22) Filed: Apr. 6, 2018

(65) Prior Publication Data

US 2018/0294967 A1 Oct. 11, 2018

Related U.S. Application Data

(60) Provisional application No. 62/483,285, filed on Apr. 7, 2017.

(51) Int. Cl.
*H04L 9/32* (2006.01)

(52) U.S. Cl.
CPC .......... *H04L 9/3236* (2013.01); *H04L 9/3247* (2013.01); *H04L 9/3255* (2013.01); *H04L 9/3297* (2013.01); *H04L 2209/38* (2013.01)

(58) Field of Classification Search
CPC ... H04L 9/3236; H04L 9/3247; H04L 9/3255; H04L 9/3297; H04L 2209/38
See application file for complete search history.

(56) References Cited

U.S. PATENT DOCUMENTS

| | | | |
|---|---|---|---|
| 10,250,708 B1* | 4/2019 | Carver | H04L 67/12 |
| 2016/0218879 A1* | 7/2016 | Ferrin | H04L 9/3247 |
| 2016/0284033 A1* | 9/2016 | Winand | G06Q 50/06 |
| 2018/0005318 A1* | 1/2018 | Pierce | G06Q 40/04 |
| 2018/0109541 A1* | 4/2018 | Gleichauf | H04W 12/10 |
| 2018/0197156 A1* | 7/2018 | Beesley | H04L 47/781 |
| 2018/0276710 A1* | 9/2018 | Tietzen | G06N 3/08 |
| 2019/0095880 A1* | 3/2019 | Glover | G06Q 40/02 |
| 2019/0310980 A1* | 10/2019 | Zhang | H04L 9/0869 |

* cited by examiner

*Primary Examiner* — Catherine Thiaw
(74) *Attorney, Agent, or Firm* — Perkins Coie LLP; Michael Glenn

(57) ABSTRACT

Disclosed embodiments include techniques to increase the probability that network validators will include a specific transaction in a target block of a blockchain. The method includes creating and signing in real-time a transaction and loading copies of the transaction at agent nodes connected to a network of peer nodes. An agent node can obtain an indication of an opportunity to write the transaction to a target block. The method can further include broadcasting the transaction to the network of peer nodes based on the obtained indication of the opportunity to write the transaction, to improve a probability of having the transaction written to the target block.

33 Claims, 5 Drawing Sheets

TECHNIQUES FOR INCREASING THE PROBABILITY THAT A TRANSACTION WILL BE INCLUDED IN A TARGET BLOCK OF A BLOCKCHAIN

CROSS-REFERENCE TO RELATED APPLICATION

This application claims to the benefit of U.S. Provisional Patent Application No. 62/483,285 titled "Micro-Services to Increase the Probability that a Transaction is Included in a Block of a Blockchain" and filed on Apr. 7, 2017, which is incorporated by reference herein in its entirety.

TECHNICAL FIELD

The disclosed teachings generally relate to micro-services for blockchain technology. More particularly, the disclosed teachings relate to using techniques for increasing the probability that a transaction is included in a target block of a blockchain.

BACKGROUND

A public blockchain is an open, distributed ledger that can record transactions between parties in a verifiable and permanent way. A blockchain is analogous to a distributed database on a distributed computing system that maintains a continuously growing list of ordered records called blocks. A block of a blockchain includes records of transaction(s) or other recorded data. Each block contains at least one timestamp, a block links to a previous block thus forming a chain of blocks. Blockchains are inherently resistant to modification of their recorded data. That is, once recorded, the data in a block cannot be altered retroactively. Through a peer-to-peer network and distributed timestamping, a blockchain is managed in a seemingly autonomous manner.

Decentralized consensus can be achieved with a blockchain. This makes blockchains suitable for recording events, medical records, other records management activities, identity management, transaction processing, and proving data provenance. Well-known examples of decentralized systems that implement blockchains include Bitcoin and Ethereum cryptocurrencies. These types of systems provide a pragmatic solution for arriving at a consensus in the face of trust and timing problems typically encountered in distributed networks.

SUMMARY

The disclosed embodiments include techniques to increase the probability that network validators will include a transaction in a target block of a blockchain. The method includes creating and signing in real-time a transaction and loading copies of the transaction at agent nodes connected to a network of peer nodes. An agent node can obtain an indication of an opportunity to write the transaction to a target block. The method can further include broadcasting the transaction to the network of peer nodes based on the obtained indication of the opportunity to write the transaction, to improve a probability of having the transaction written to the target block.

The disclosed embodiments also include a server computer that includes a processor and a memory including instructions that, when executed by the processor, cause the server computer to load copies of a transaction at agent node(s) connected to a network of peer nodes, obtain an indication of an opportunity to write the transaction to a target block, and propagate one or more copies of the transaction to the network of peer nodes based on the obtained indication of the opportunity to write the transaction.

The disclosed embodiments also include a method performed by a server computer of a network including peer nodes configured to maintain a blockchain. The method includes obtaining information associated with the network of peer nodes, and propagating copies of a transaction to the network of peer nodes based on the obtained information to increase the probability that the transaction will be recorded to a target block of a blockchain.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter. Other aspects of the disclosed embodiments will be apparent from the accompanying Figures and Detailed Description.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating" or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, the terms "connected," "coupled," or variants thereof, refer to any connection or coupling, either direct or indirect, between two or more elements. The coupling or connection between the elements can be physical, logical, or a combination thereof.

A blockchain can implement a digital distributed leger. In layman's terms, a digital distributed ledger has digital records of things such as transactions that are distributed and maintained among nodes of a computer network, where the entries are stored in blocks of the ledger that are cryptographically related somehow. Specifically, a blockchain system has a decentralized, distributed database where a ledger is maintained at peer nodes. Hence, an intermediary is not required to maintain a blockchain. The transactions are typically authenticated with cryptographic hashing and mining techniques.

Figure 1:
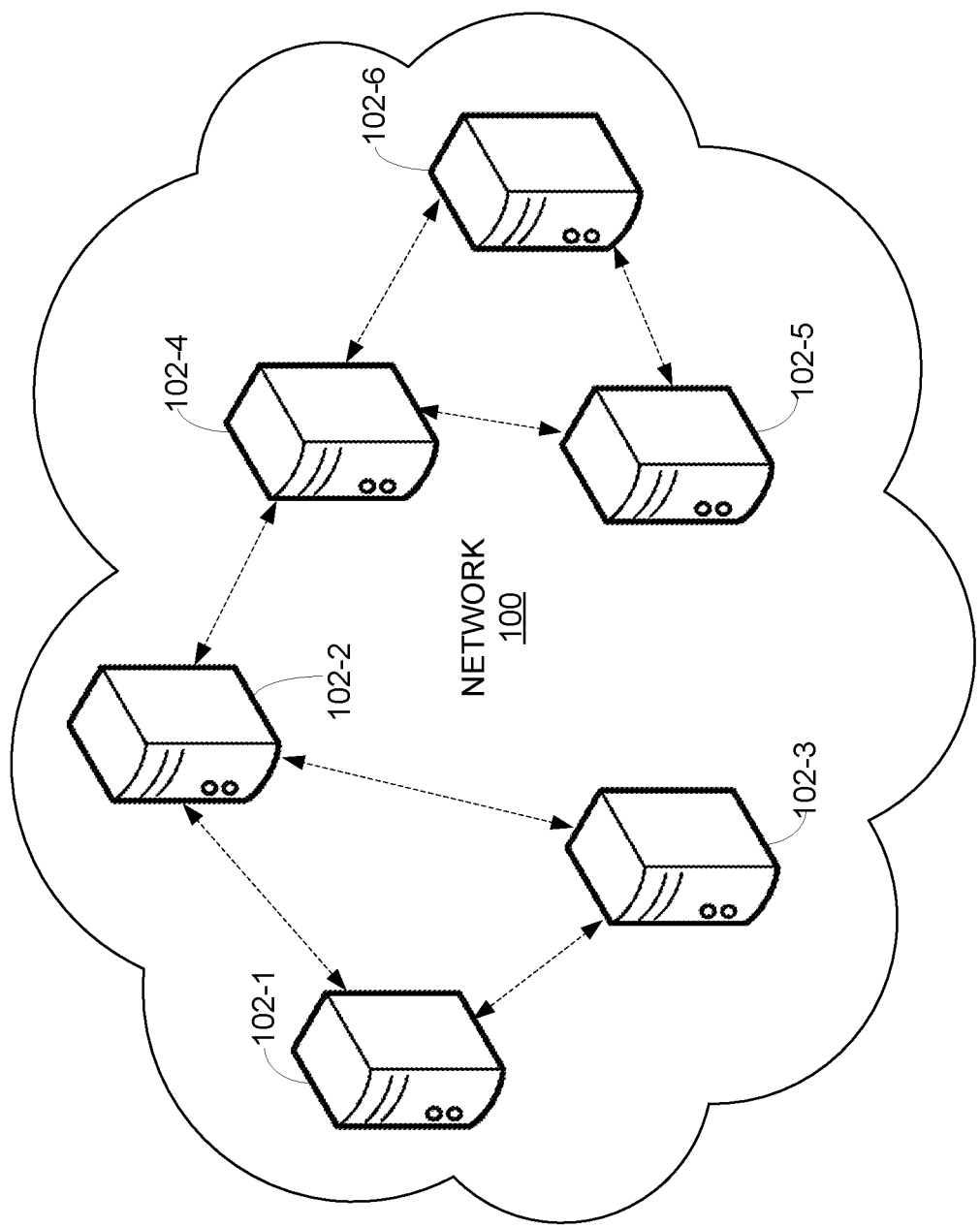
FIG. 1 is a block diagram that illustrates a network of peer nodes that can implement a blockchain.

FIG. 1 illustrates a network 100 of interconnected peer nodes 102-1 through 102-6 (also referred to collectively as peer nodes 102 and individually as peer node 102). The peer nodes 102 may be distributed across various geographic locations including regions all over the world. The disclosed embodiments may implement micro-services that influence the behavior of a blockchain implemented on the peer nodes 102. The network 100 may include a combination of private, public, wired, or wireless portions. Data communicated over the network 100 may be encrypted or unencrypted at various locations or portions of the network 100. Each peer node 102 may include combinations of hardware and/or software to process data, perform functions, communicate over the network 100, and the like.

The peer nodes 102 may include computing devices such as servers, desktop or laptop computers (e.g., APPLE MACBOOK, LENOVO 440), handheld mobile devices (e.g., APPLE IPHONE, SAMSUNG GALAXY, MICROSOFT SURFACE), and any other electronic computing device. Any component of the network 100 may include a processor, memory or storage, a network transceiver, a display, operating system and application software (e.g., for providing a user interface), and the like. Other components, hardware, and/or software included in the network 100 that are well known to persons skilled in the art are not shown or discussed herein for the sake of brevity.

The network 100 can implement a blockchain that allows for the secure management of a shared ledger, where transactions are verified and stored on the network 100 without a governing central authority. Blockchains can be implemented in different configurations, ranging from public, open-source networks, to private blockchains that require explicit permission to read or write transactions. Central to a blockchain are cryptographic hash functions that secure the network 100, in addition to enabling transactions, to protect a blockchain's integrity and anonymity.

The network 100 may utilize cryptography to securely process transactions. For example, public-key cryptography uses asymmetric key algorithms, where a key used by one party to perform either encryption or decryption is not the same as the key used by another in the counterpart operation. Each party has a pair of cryptographic keys: a public encryption key and a private decryption key. For example, a key pair used for digital signatures consists of a private signing key and a public verification key. The public key may be widely distributed, while the private key is known only to its proprietor. The keys are related mathematically, but the parameters are chosen so that calculating the private key from the public key is unfeasible. Moreover, the keys could be expressed in various formats, including hexadecimal format.

Figure 2:
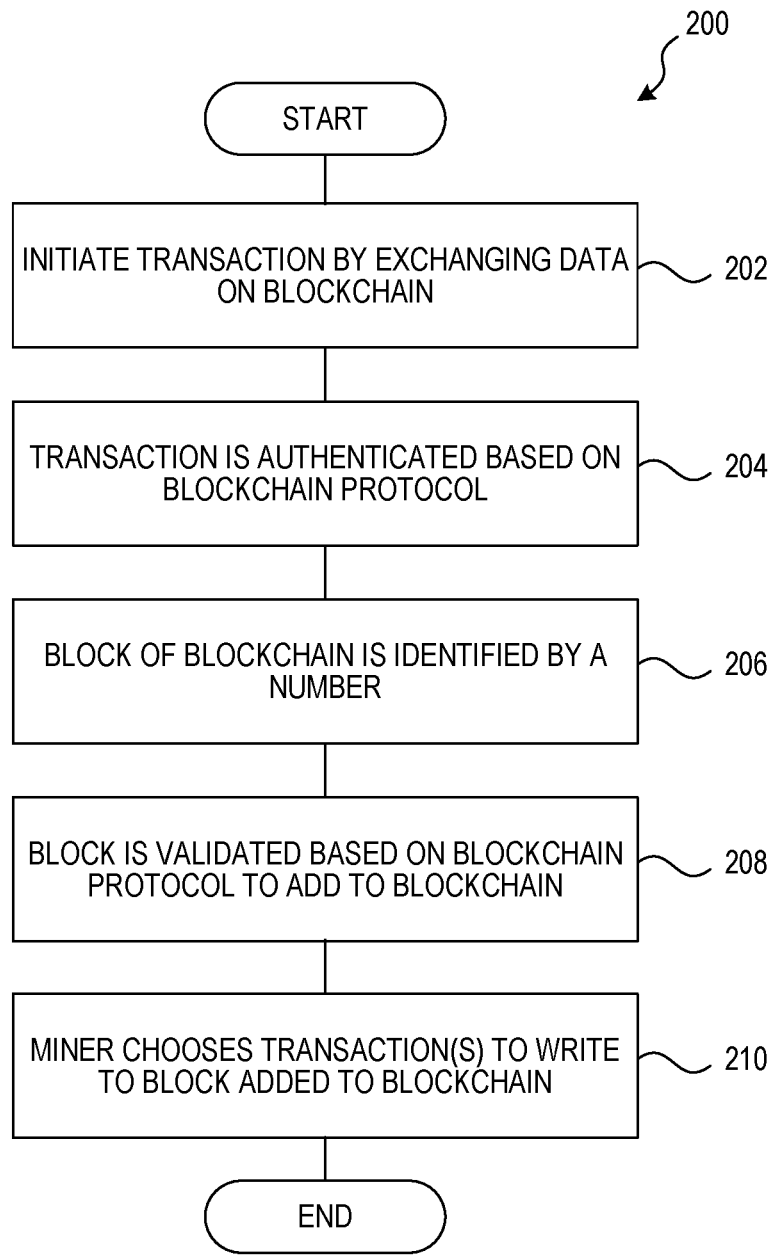
FIG. 2 is a flow diagram that illustrates a method for implementing a blockchain on a network of peer.

FIG. 2 is a flowchart of processes 200 implemented by a blockchain on a network of peer nodes. In step 202, a transaction is initiated when two parties exchange data (e.g., money, contracts, deeds, medical records, customer details, or any other asset that can be represented in digital form). It should be understood that the steps of the processes 200 can be practiced in different orders and/or omit some steps and/or add other steps that would be well known to persons skilled in the art.

In step 204, the transaction is authenticated either instantaneously or placed in a queue of pending transactions. The network of peer nodes can determine if the transaction is valid based on rules of the blockchain protocol implemented on the network.

In step 206, a block of the blockchain is identified by a number (e.g., 256-bit hash number) created by using an algorithm of the blockchain protocol. Each block contains a header, a reference to a previous block's number, and data indicative of transactions. The sequence of linked hashes creates a secure chain of blocks.

In step 208, a block must be validated before being added to the blockchain. In open-source blockchains, a form of validation is proof-of-work (POW) whereby the solution to a mathematical "puzzle" derived from a block's header is used for validation. The block can be added to the blockchain once verified by a selected peer node (also referred to as a miner or validator node).

Specifically, a blockchain protocol can implement a "mining" mechanism for verification purposes. For example, an open source system could employ a POW mechanism (e.g., SHA-256 hash), where a solution to a mathematical problem is based on the data contained within the transaction and all previous blocks in the blockchain. The solution is computationally asymmetric in that it is generally computationally easy to verify but difficult to initially solve. In some instances, a miner node can attempt to "solve" the block by making incremental changes to one variable until the solution satisfies a network-wide target. A POW cannot be falsified because mining operations are computationally expensive. For example, estimates of electricity used by global mining activity exceeds 1,000 MW. Accordingly, mining requires compute power (e.g., hardware), network connectivity, and electricity, which is the dominate cost. The incentive for a miner to expend this necessary amount of power is a reward (e.g., monetary and/or authorization to write a next block of the blockchain).

In step 210, a miner that solved the "puzzle" is rewarded and adds a block to the blockchain. The block is propagated to the network of peer nodes, and each node adds the block to the network's immutable and auditable blockchain. A malicious miner may try to submit an altered block to the chain that would change the number of a block and all subsequent blocks. However, the other peer nodes would detect the attempted change and reject the block from the blockchain, which prevents corruption of the blockchain.

The process 200 is a non-limiting example of an implementation that could have an application for transferring virtual currency. For example, Bitcoin is a digital currency that is cryptographically secured based on blockchain technology. It derives is value from scarcity and "trust" in the system. For example, the total number of Bitcoins is limited to 21 million in circulation. A Bitcoin is effectively infinitely divisible, and creation of a new bitcoin is adjusted such that a new block is added to the blockchain approximately every 10 minutes. Financial rewards for mining a new block of the Bitcoin blockchain started at 50 Bitcoins in 2009, and reduces as the number of Bitcoins in circulation increases. For example, a reward in 2017 is 12.5 Bitcoin, and is expected to be reduced again to 6.25 Bitcoin in 2021. At least 6 blocks must be mined before a transaction is typically considered secure and confirmed.

Bitcoins are stored on a blockchain in the sense that the ledger tracks the quantity of Bitcoins associated with each address. Each public key address on the blockchain can be associated with a digital wallet, which represents the private key storage and associated public key. Thus, a wallet is associated with a private key that must be kept safe and known. Loss of a private key is an irrevocable loss of Bitcoins associated with that wallet. Digital signatures based on the private key aid to authenticate, guarantee integrity, and cannot be repudiated.

Ethereum is an example of a cryptocurrency that also offers smart contract functionality. Smart contracts are computer protocols intended to facilitate, verify, or enforce performance of a contract. A smart contract can be accomplished via a combination of blockchain technology and self-execution or self-enforcement. Examples of smart contracts include credit default swaps, gambling or sports betting, prediction markets, welfare benefits, supply chain, insurance, etc.

Other examples of blockchain applications include chain of title or real property transfers; supply chain auditing or management; intellectual property protection; identification and health management; equity trading and financial services; records management and security, and basically anything that one would need or want to track. Another application of blockchain is in venture capital, including so called initial coin offerings (ICOs). Any of these transactions can be represented online in a block, where the block is broadcast to every peer node of the network. Once the network approves the transactions as valid, they are added to a block of the blockchain, which provides an indelible and transparent record of transactions.

The disclosed techniques include at least one method to increase the probability that a transaction is recorded to a target block of a blockchain. The methods can be used in whole or in part, in a distributed system or separately, to increase the probability that a specific transaction will be included in a target block of a blockchain. A blockchain can be implemented on a network (e.g., network 100) of geographically distributed peer nodes (e.g., peer nodes 102). The peer nodes run independent software programs that can create and/or propagate transactions over the network of peer nodes.

It takes time to propagate information on any network and, likewise, propagating transactions of a blockchain across a global network takes time. A transaction is not finalized until it is included in a block by a validator, which can be a designation of a peer node that is selected randomly, pseudo-randomly, or that competes and wins the right to choose which transactions to write to the next block. Validators that create the next block are typically awarded a fee for creating the block, and have the right to collect transaction fees from the transactions that they include in the block. It is impossible to know what peer node will be the validator before the validator is chosen or wins.

Figure 3:
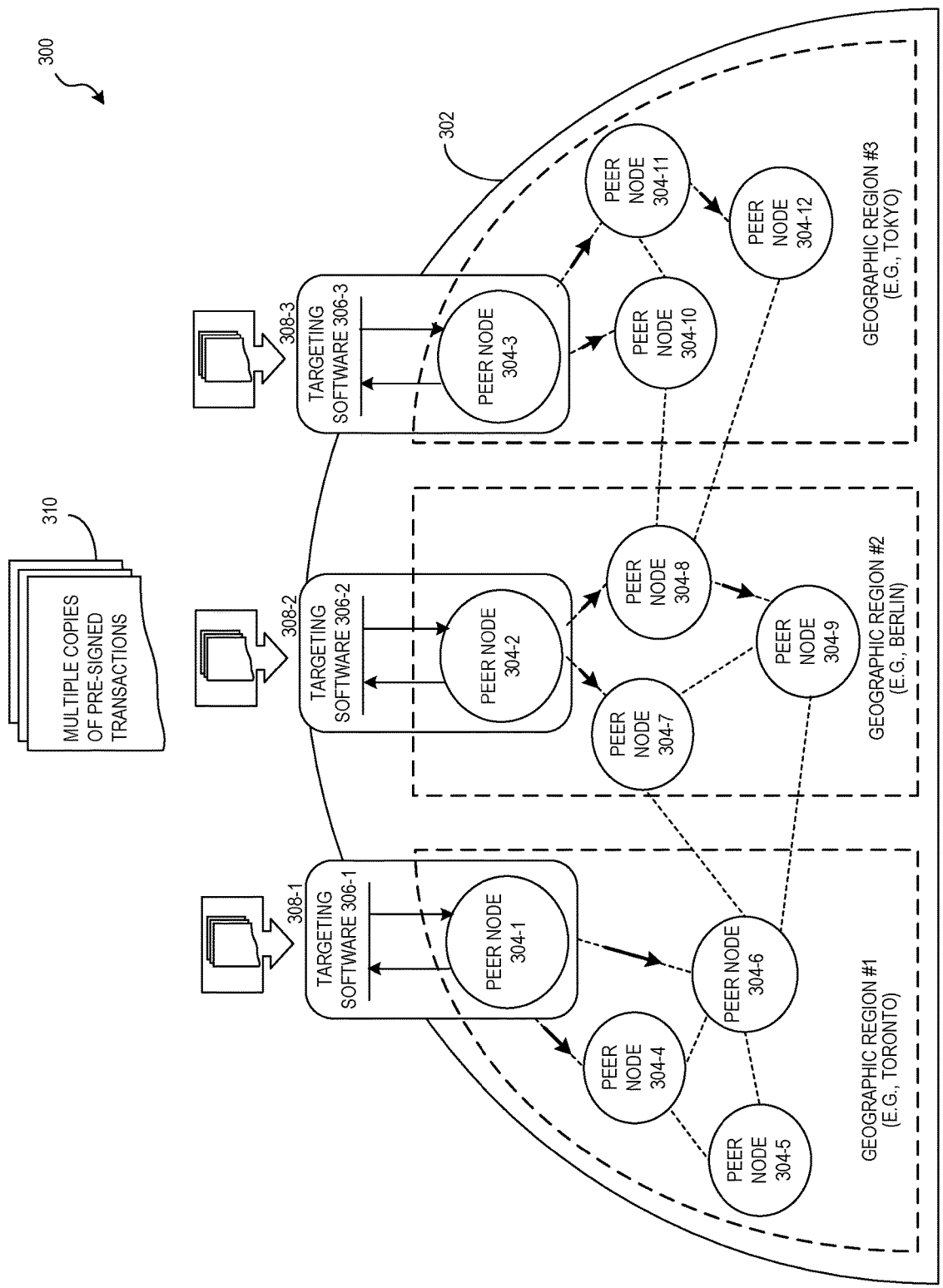
FIG. 3 is a block diagram that illustrates a system operable to increase the probability of having a transaction written to a target block of a blockchain.

FIG. 3 is a block diagram that illustrates a system 300 operable to increase the probability of writing a transaction to a target block of a blockchain. Specifically, the system 300 can perform processes for increasing the probability that a network validator of peer nodes will write a transaction in a target block of a blockchain. The illustrated system 300 is one of many possible configurations that can combine multiple transactions and geographic distribution methods to increase the probability of writing a transaction to a target block of a blockchain.

The system 300 includes a network 302 of peer nodes 304-1 through 304-12 (also referred to collectively as peer nodes 304 and individually as peer node 304) that maintain a blockchain. As shown, the peer nodes 304-1, 304-2, and 304-3 each execute targeting software 306-1, 306-2, and 306-3 (also referred to collectively and individually as targeting software 306), respectively, that can exchange information with the peer nodes 304 that maintain the blockchain. The local peer nodes 304-1, 304-2, and 304-3 that execute the targeting software 306-1, 306-2, and 306-3, respectively, are referred to as agent nodes 308-1, 308-2, and 308-3 (also referred to collectively as agent nodes 308 and individually as agent node 308), respectively. As shown, the agent nodes 308 are part of the network of peer nodes 304 that maintain the blockchain. However, in some embodiments, the agent nodes 308 perform functions to increase the probability of writing a transaction to a block of the blockchain but do not themselves operate to maintain the blockchain. That is, the agent nodes can read data from the blockchain but may not be operable to write to a blockchain.

The agent nodes 308 can load copies of pre-signed transactions 310. The copies of the transactions 310 have can the same objective (e.g., to be written to a target block of a blockchain). The copies of the transactions 310 are received by the targeting software 306, which can exchange information with other agent nodes and/or with the peer nodes 304 that maintain the blockchain. For example, a targeting software (e.g., targeting software 306-1) of an agent node (e.g., agent node 308-1) can receive a block number from a local peer node (e.g., peer node 304-1) and send a copy of a transaction to the local peer node, which can execute validation software to add the transaction to a specific numbered block (relative to the received block number).

A peer node that is geographically closer to an agent node that sent a transaction will be first to receive it compared to other peer nodes. A "geographically closer" peer node is physically closer to an agent node compared to other peer nodes. For example, peer nodes of geographic region #1 are closer to the agent node 308-1 compared to peer nodes of geographic regions #2 or #3. The probability that a validator node (i.e., peer node executing validation software) writes the transaction to a target block is increased by optimizing the propagation of the transaction across the network 302. Specifically, a transaction received by a validator node before any other transactions are received will write that transaction to the target block. This can be achieved in part by having the agent node that is relatively closer to a validator node send its transaction first.

Specifically, instances of targeting software 306 run on machines (e.g., agent nodes 3068) that can be distributed geographically in an arbitrary manner. As shown, instances of the targeting software 306 are co-located in the same geographic region as possible transaction validators (e.g., peer nodes 304). The agent nodes 308 are elastic such that they can be started or stopped in regions based on changing network conditions (e.g., lag, increasing/decreasing number of validators). A geographically distributed instance of a targeting software can broadcast a transaction upon receiving notice that a target block will be reached by a peer node, to increase the probability that the transaction will be written to the target block by that validator node.

In some embodiments, the disclosed techniques involve gathering and analyzing information of the peer nodes, the blockchain protocol, historical information, transaction propagation, and behavior of the validation network to determine when and how to propagate transactions in a manner that increases the probability that a transaction will be written to a target block of the blockchain. For example, the targeting software 306 can monitor and analyze the behavior of a public blockchain and its validators to determine the probability that the next block will happen at a point in time or time delay from previous blocks. Moreover, the instances of the targeting software 306 that are deployed at different geographic regions can be interconnected to share statistics about their local peer nodes.

For example, each instance of a targeting software can analyze any combination of the number of transactions included in the last N blocks of a blockchain, the time between mined blocks received by a targeting software, the time delay between when a pending transaction is received and when it is written to a block, etc. In some embodiments, each instance of the targeting software may analyze any combination of the characteristics of pending transactions that are included in a block by validator nodes; the threshold of transaction fees required for a transaction to be included in a block by validator nodes; the current validator rewards; changes in validator rewards over time; changes in validation difficulty in response to an increase/decrease in the number of active validators; characteristics of validated transactions or blocks that are not included in the blockchain; a propagation time for receipt of pending transactions, created blocks, changes in validation fees, changes in numbers of validators, and other network statistics; and test transactions sent to the network to test, monitor, and gather data about the above conditions. Based on an analysis of combinations of these factors, an agent node can broadcast a transaction to the network at a calculated time that increases the likelihood that the transaction will be included in a target block.

The agent nodes 308 running the targeting software 306 can create and broadcast copies of transactions meant to produce the same outcome of writing the transactions to a target block. In some embodiments, the transactions are pre-signed, or created and signed in real-time. In some embodiments, the transactions are sent out sequentially (and/or periodically) before the expected target block to increase the odds that a transaction will be included in the target block, to achieve the desirable result.

In some embodiments, the financial incentives for including a transaction in a block of a blockchain can be dynamically altered. For example, in traditional electronic marketplaces, competition for a given trade opportunity is typically restricted by a time dimension. Market participants generally pay fixed transaction fees, and competition centers around the speed of order executions and who can get to the opportunity first. On a blockchain, this competition is likely to happen on both time and price dimensions. In particular, due to the mechanics of blockchains, market participants have an equal amount of time to access a given opportunity. The market participants will be more likely to compete on a price dimension, in what can be referred to as a "block priority auction." Given a specific trade opportunity, market participants can compete with each other to pay transaction validators to assign the transaction to themselves.

For example, on decentralized exchange "A," there can be a buy order for token "ABC" at $25 per token. On decentralized exchange "B," there can be a sell order for token "ABC" at $10 per token. The market is "crossed" and there is an arbitrage opportunity to make $15 per token by instantaneously buying token "ABC" on exchange '13' and selling it on exchange "A." The first participant to successfully buy token "ABC" on exchange "B" will realize the arbitrage opportunity. Multiple participants will compete to have their transactions included in the next block to record their purchase of token "ABC." The validator who mines this block will have to choose which market participant's transaction to include, and will rationally include the transaction which pays the validator the highest fee. Those market participants that can make the most of this opportunity will be able to pay the greatest amount to transaction validators, and the transaction will be assigned to them.

The disclosed techniques can change the fee associated with a transaction or subsequent transactions by estimating the computational resources that a transaction will use; analyze the fees collected by validators; analyze the fees included in other transactions; and set the optimal fee that positions a transaction as the most rewarding to validators based on the above analysis.

In some embodiments, an agent node running an instance of a validation software can prioritize a transaction loaded onto the agent node. In particular, it is possible that the value of getting a transaction included in a target block exceeds the cost of becoming a validator for the target block and, as such, will prioritize writing a transaction to a target block over becoming the validator node for a target block. Additionally, if already acting as validator node, there is a small probability of validating a target block as a free benefit. The validation software is aware of its own transactions and can both broadcast its transactions to peer nodes and attempt to validate a block containing its own transaction.

In some embodiments, the details of transactions loaded to agent nodes are shaped based on an analysis of mining pools of a network of peer nodes. A mining pool is a group of validator nodes that have pooled their resources to increase the probability of mining a next block. Mining pools might have specific conditions by which they will include a transaction in a block. Examples of these conditions include transaction fee minimums, specific policies on mining blocks with and without transactions, network propagation speed requirements, and blockchain state change requirements. By analyzing characteristics of a specific mining pool, transaction details can be shaped to increase the probability that the specific mining pool will include a transaction in a target block.

Figure 4:
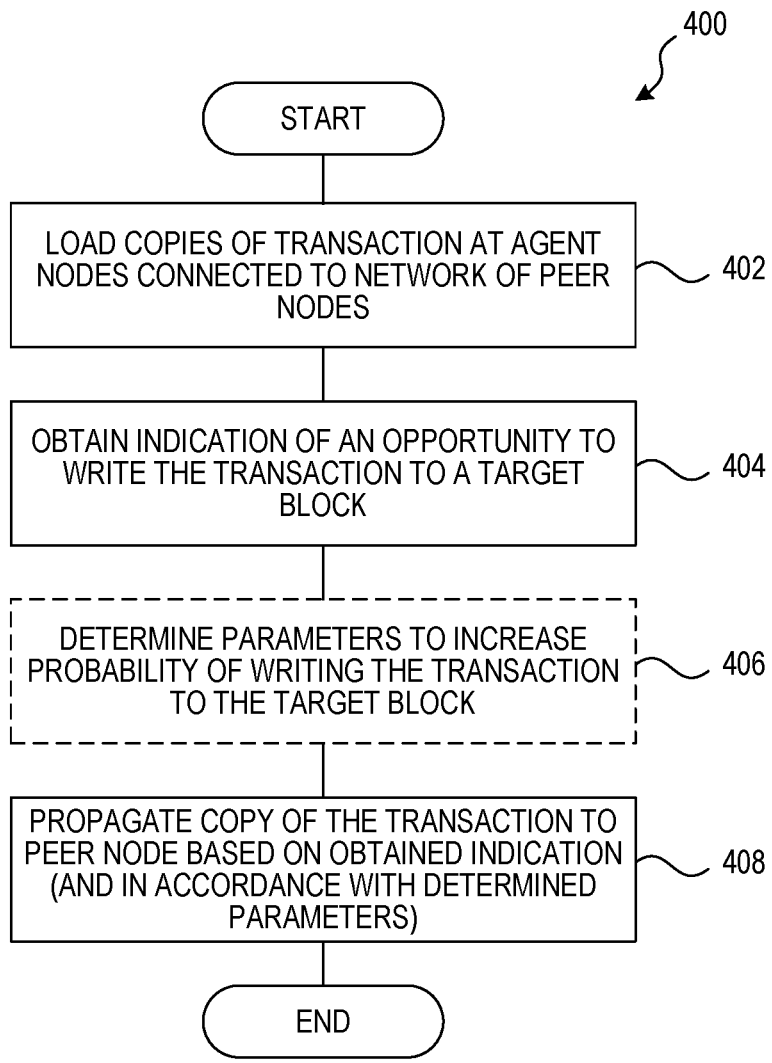
FIG. 4 is a flow diagram that illustrates a method for increasing the probability of recording a transaction to a target block of a blockchain.

FIG. 4 is a flow diagram that illustrates a method 400 for increasing the probability of having a transaction written to a target block of a blockchain. The blockchain may be a decentralized public blockchain and/or can implement an asset exchange such that transactions indicate a purchase or sale of an asset. In some embodiments, the method 400 can be performed by one or more server computers. A server computer (e.g., agent node) may have a processor and memory including instructions that, when executed by the processor, cause the agent node to perform the method 400.

In step 402, copies of one or more transactions are loaded at agent nodes connected to a network of peer nodes. In some embodiments, the agent nodes are peer nodes that participate to maintain the blockchain. In some embodiments, the network latency of the network of peer nodes is greater than a network latency of the agent nodes such that the agent nodes can exchange information with peer nodes more rapidly than information can be propagated throughout the network of peer nodes.

The agent nodes may be globally distributed such that each agent node is located at a different geographic region that includes a distinct subset of peer nodes. In some embodiments, the agent nodes may form, or be part of, a backend network that can obtain information about the network of peer nodes, load copies of pre-signed transactions or load copies of transactions created and signed in real-time, propagate the copies to the peer nodes, and exchange information about the peer nodes among the agent nodes. In some embodiments, the transaction is a purchase of a limited supply of assets of an initial offering (e.g., an initial coin offering (ICO)). In some embodiments, the transaction is one of a temporally ordered set of transactions available for writing to a target block.

In step 404, agent node(s) can obtain an indication of an opportunity to write a transaction to a target block. The target block may be associated with a point in time at which the transaction is to be written to the blockchain. The target block may be a next block of the blockchain, or a block other than the next block. The indication may be sent to the agent node by one or more of a subset of peer nodes. For example, the indication may be of another block relative to the target block. In another example, the obtained indication is of a previous block on which a transaction was written.

Agent node(s) can determine values for parameters that increase the probability of having a transaction written to a target block of a blockchain. For example, in step 406, a target fee amount can be set for a transaction to a value greater than any other fee for any other transaction that could be written to the target block. The fee can be determined by, for example, estimating computational resources that a transaction will use, analyzing fees collected by validators, and analyzing fees associated with other transactions.

In some embodiments, agent node(s) can share obtained information of the peer nodes to coordinate behavior that increases the probability of including a transaction in a target block. For example, agent node(s) can determine when to broadcast copies of transactions based on a determination of a threshold amount of fees required for a transaction to be written to the target block by a validator node (e.g., analyzing current validator rewards, changes in validator rewards, and/or changes in validation difficulty responsive to an increase/decrease in a quantity of active validators).

In some embodiments, agent node(s) can calculate when to broadcast copies of a transaction based on an analysis of, for example, a quantity of transactions written in prior blocks of the blockchain, a time delay between when a transaction is received and written to a block of the blockchain, a characteristic of a pending transaction or transaction written to a block of the blockchain, or a characteristic of a block that was not included in the blockchain.

Other examples used to calculate a optimal broadcast time include time(s) for each agent node to receive information indicative of a transaction, creation of a block, changes in validation fees, changes of a quantity of validators, or a statistic of the network of peer nodes. Yet another example includes a test transaction sent to a network of peer nodes to test, monitor, and gather data about conditions of the network of peer nodes. The results of the test could be used to determine an optimal way to propagate transactions.

In some embodiments, agent node(s) can monitor the network of peer nodes to determine a probability that a target block will be created at a pre-selected point in time or at a pre-selected point in time relative to a previous block. For example, each agent node can independently monitor one or more local peer nodes and propagate transaction(s) to the monitored peer nodes. Moreover, an agent node can attempt to cause a peer node to be selected as a validator node for writing a transaction to the target block.

In some embodiments, the propagation of transactions depends on a group of peer nodes with pooled resources that increase a probability that the group will write a next block of the blockchain. For example, agent node(s) can calculate a point in time to broadcast the transaction based on an analysis of the peer nodes with pooled resources, which increase a probability that the group will write a next block of the blockchain.

In step 408, agent node(s) can propagate copies of a transaction to peer nodes based on an obtained indication and/or determined optimization parameters that improve a probability of having the transaction written to the target block. In some embodiments, the copies may be propagated responsive to obtaining the indication. In some embodiments, the copies are propagated to a subset of peer nodes that includes a peer node selected as a validator node to write a transaction to the target block. The peer node selected as a validator node can select which of many transactions is written to the target block. A validator node may be randomly or pseudo-randomly selected, or selected as the winner of an auction for an opportunity to write a next block of the blockchain.

In some embodiments, the copies are broadcast by an agent node to any peer nodes in a geographic region that includes the agent node. In some embodiments, the copies are broadcast sequentially (and/or periodically) beginning prior to an estimated point in time when creation of the target block is expected. In some embodiments, where there are multiple copies of multiple different transactions, the agent nodes can prioritize certain transactions among the different transactions to propagate across the network of peer nodes.

The method 400 is a non-limiting example of processes for increasing a probability of having a transaction written to a target block. A person skilled in the art would understand that other embodiments within the scope of the disclosure may perform the steps of the method 400 in another order, omit steps, and/or include additional steps that are well known to persons skilled in the art.

Figure 5:
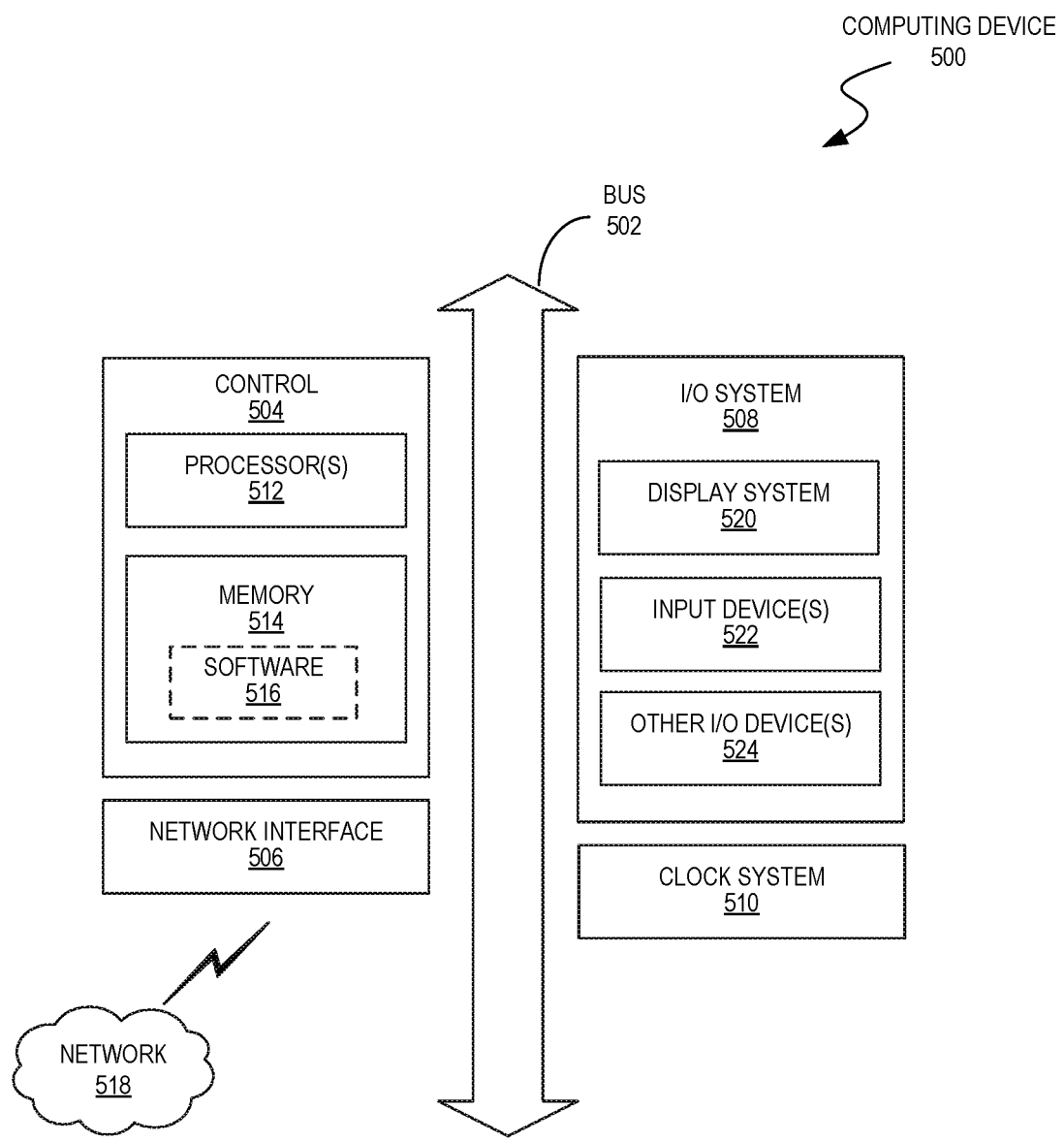
FIG. 5 is a block diagram that illustrates a computer operable to implement aspects of the disclosed technology.

FIG. 5 is a block diagram of a computing device 500 of system 300 operable to implement the disclosed technology. The computing device 500 (e.g., agent node 308, peer node 304) may be a generic computer or specifically designed to carry out features of system 300. For example, the computing device 500 may be a system-on-chip (SOC), a single-board computer (SBC) system, a desktop or laptop computer, a kiosk, a mainframe, a mesh of computer systems, a handheld mobile device, or combinations thereof.

The computing device 500 may be a standalone device or part of a distributed system that spans multiple networks, locations, machines, or combinations thereof. In some embodiments, the computing device 500 operates as a server computer or a client device in a client-server network environment, or as a peer machine in a peer-to-peer system. In some embodiments, the computing device 500 may perform one or more steps of the disclosed embodiments in real time, in near real time, offline, by batch processing, or combinations thereof.

As shown, the computing device 500 includes a bus 502 operable to transfer data between hardware components. These components include a control 504 (i.e., processing system), a network interface 506, an Input/Output (I/O) system 508, and a clock system 510. The computing device 500 may include other components not shown or further discussed for the sake of brevity. One having ordinary skill in the art will understand any hardware and software included but not shown in FIG. 5.

The control 504 includes one or more processors 512 (e.g., central processing units (CPUs), application specific integrated circuits (ASICs), and/or field programmable gate arrays (FPGAs)) and memory 514 (which may include software 516). The memory 514 may include, for example, volatile memory such as random-access memory (RAM) and/or non-volatile memory such as read-only memory (ROM). The memory 514 can be local, remote, or distributed.

A software program (e.g., software 516), when referred to as "implemented in a computer-readable storage medium," includes computer-readable instructions stored in a memory (e.g., memory 514). A processor (e.g., processor 512) is "configured to execute a software program" when at least one value associated with the software program is stored in a register that is readable by the processor. In some embodiments, routines executed to implement the disclosed embodiments may be implemented as part of operating system (OS) software (e.g., MICROSOFT WINDOWS, LINUX) or a specific software application, component, program, object, module or sequence of instructions referred to as "computer programs."

As such, the computer programs typically comprise one or more instructions set at various times in various memory devices of a computer (e.g., computing device 500) and which, when read and executed by at least one processor (e.g., processor 512), cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., the memory 514).

The network interface 506 may include a modem or other interfaces (not shown) for coupling the computing device 500 to other computers over the network 518 (e.g., network 100, network 302). The I/O system 508 may operate to control various I/O devices, including peripheral devices such as a display system 520 (e.g., a monitor or touch-sensitive display) and one or more input devices 522 (e.g., a keyboard and/or pointing device). Other I/O devices 524 may include, for example, a disk drive, printer, scanner, or the like. Lastly, the clock system 30 controls a timer for use by the disclosed embodiments.

Operation of a memory device (e.g., memory 514), such as a change in state from a binary one to a binary zero (or vice versa) may comprise a visually perceptible physical transformation. The transformation may comprise a physical transformation of an article to a different state or thing. For example, a change in state may involve accumulation and storage of charge or release of stored charge. Likewise, a change of state may comprise a physical change or transformation in magnetic orientation, or a physical change or transformation in molecular structure, such as from crystalline to amorphous or vice versa.

Aspects of the disclosed embodiments may be described in terms of algorithms and symbolic representations of operations on data bits stored on memory. These algorithmic descriptions and symbolic representations generally include a sequence of operations leading to a desired result. The operations require physical manipulations of physical quantities. Usually, though not necessarily, these quantities take the form of electrical or magnetic signals capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

The invention claimed is:

1. A method for increasing a probability of having a transaction written to a target block of a blockchain, the method comprising:
   loading a plurality of copies of a transaction at a plurality of agent nodes connected to a network of peer nodes;
   obtaining, by an agent node, an indication of an opportunity to write the transaction to a target block; and
   propagating copies of the transaction to the network of peer nodes based on the obtained indication of the opportunity to write the transaction, to improve a probability of having the transaction written to the target block,
   wherein the plurality of agent nodes belongs to a backend network configured to obtain information of the network of peer nodes, load copies of pre-signed transactions or load copies of transactions created and signed in real time, propagate the copies of the transaction to the network of peer nodes, and exchange information about the network of peer nodes among the plurality of agent nodes.

2. The method of claim 1, wherein the copies of the transaction are propagated to a subset of peer nodes that includes a peer node selected as a validator node to write a transaction to the target block.

3. The method of claim 1, wherein the indication of the opportunity to write the transaction to the target block is sent by a subset of peer nodes.

4. The method of claim 1, wherein the indication is of another block of the blockchain relative to the target block.

5. The method of claim 1, wherein the plurality of agent nodes is globally distributed such that each agent node is located at a different geographic region that includes a different subset of peer nodes.

6. The method of claim 1, wherein the blockchain is a decentralized public blockchain.

7. The method of claim 1, wherein each agent node is configured to independently monitor a peer node and propagate a transaction to the peer node.

8. The method of claim 1, wherein each agent node is configured to independently monitor a peer node, propagate a transaction to the peer node, and attempt to be selected by the network of peer nodes to write a transaction to a block of the blockchain.

9. The method of claim 1, wherein an agent node is randomly selected as a validator node to write a next block of the blockchain.

10. The method of claim 1, wherein any agent node that wins an auction for an opportunity to write a transaction to a block of the blockchain is selected as a validator node to write a next block of the blockchain.

11. The method of claim 1, wherein each agent node is operable to adapt based on changing conditions of the network of peer nodes.

12. The method of claim 1 propagating the copies of the transaction further comprises:
responsive to obtaining the indication of the opportunity to write the transaction, broadcasting the copies of the transaction by the agent node to any peer nodes in a geographic region that includes the agent node.

13. The method of claim 1 further comprising, prior to propagating the copies of the transaction:
monitoring the network of peer nodes to determine a probability that the target block will be created at a pre-selected point in time or at a pre-selected point in time relative to a previous block.

14. The method of claim 1 further comprising:
sharing obtained information among the plurality of agent nodes.

15. The method of claim 1, wherein propagating copies of the transaction comprises:
calculating when to broadcast the copies of the transaction based on an analysis of:
a plurality of transactions written in prior blocks of the blockchain;
a time delay between when a transaction is received and written to a block of the blockchain;
a characteristic of a pending transaction or transaction written to a block of the blockchain;
a characteristic of a block that is not included in the blockchain;
a propagation time for each agent node to receive information indicative of a transaction, creation of a block, a change of validation fees, a change of a quantity of validators, or a statistic of the network of peer nodes; or
a test transaction sent to the network of peer nodes to test, monitor, and gather data about conditions of the network of peer nodes.

16. The method of claim 1, wherein propagating copies of the transaction comprises:
calculating when to broadcast the copies of the transaction based on an analysis of a threshold of fees required for a transaction to be written to the target block by a validator including any of current validator rewards, changes in validator rewards, or changes in validation difficulty in response to an increase or decrease in a quantity of active validators.

17. The method of claim 1, wherein the transaction is pre-signed or created and signed in real-time.

18. The method of claim 1 further comprising, prior to propagating the copies of the transaction:
setting an optimal fee associated with the transaction to a value greater than any fee associated with other transactions available to write to the target block.

19. The method of claim 18, wherein the optimal fee is determined by:
estimating computational resources that the transaction will use;
analyzing fees collected by validators; and
analyzing fees included in other transactions.

20. The method of claim 1, wherein the target block is associated with a point in time at which the transaction is to be written to the blockchain.

21. The method of claim 1, wherein the transaction is a purchase of a limited supply of assets of an initial offering.

22. The method of claim 1, wherein the transaction is one of a temporally ordered set of transactions available for writing to the target block.

23. The method of claim 1, wherein the blockchain implements a decentralized asset exchange such that the transaction indicates a purchase or sale of an asset.

24. The method of claim 1, wherein a peer node selected as a validator node is operable to select which of a plurality of transactions is written to the target block.

25. The method of claim 1, wherein the obtained indication is of a previous block of the blockchain on which a transaction was written.

26. The method of claim 1, wherein the target block is a next block of the blockchain.

27. The method of claim 1, wherein the target block is a block other than a next block of the blockchain.

28. The method of claim 1, wherein a network latency of the network of peer nodes is greater than a network latency of the plurality of agent nodes.

29. The method of claim 1 further comprising, prior to propagating the copies of the transaction:
prioritizing the transaction from a plurality of different transactions for the network of peer nodes.

30. The method of claim 1, wherein propagating copies of the transaction further comprises:
calculating a point in time to broadcast the transaction based on an analysis of a group of peer nodes with pooled resources that increase a probability that the group of peer nodes will write a next block of the blockchain.

31. The method of claim 1, wherein propagation of the transaction depends on a group of peer nodes with pooled resources that increase a probability that the group will write a next block of the blockchain.

32. A method for increasing a probability of having a transaction written to a target block of a blockchain, the method comprising:
loading a plurality of copies of a transaction at a plurality of agent nodes connected to a network of peer nodes;
obtaining, by an agent node, an indication of an opportunity to write the transaction to a target block; and
propagating copies of the transaction to the network of peer nodes based on the obtained indication of the opportunity to write the transaction, to improve a probability of having the transaction written to the target block, by broadcasting the copies of the transaction sequentially beginning prior to an estimated point in time when creation of the target block is expected.

33. A server computer comprising:
a processor; and
a memory containing instructions that, when executed by the processor, cause the server computer to:
load a plurality of copies of a transaction at a plurality of agent nodes connected to a network of peer nodes;
obtain an indication of an opportunity to write the transaction to a target block; and
propagate copies of the transaction to the network of peer nodes based on the obtained indication of the opportunity to write the transaction, to improve a probability of having the transaction written to the target block,
wherein the plurality of agent nodes belongs to a backend network configured to obtain information of the network of peer nodes, load copies of pre-signed transactions or load copies of transactions created and signed in real time, propagate the copies of the transaction to the network of peer nodes, and exchange information about the network of peer nodes among the plurality of agent nodes.

\* \* \* \* \*